United States Patent
Kamble et al.

(10) Patent No.: US 8,982,905 B2
(45) Date of Patent: Mar. 17, 2015

(54) FABRIC INTERCONNECT FOR DISTRIBUTED FABRIC ARCHITECTURE

(75) Inventors: Keshav Govind Kamble, Fremont, CA (US); Alexander Philip Campbell, Kanata (CA); Atul A. Tambe, Cupertino, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 13/222,039

(22) Filed: Aug. 31, 2011

(65) Prior Publication Data

US 2012/0297103 A1    Nov. 22, 2012

Related U.S. Application Data

(60) Provisional application No. 61/486,383, filed on May 16, 2011.

(51) Int. Cl.
*H04L 12/931* (2013.01)

(52) U.S. Cl.
CPC .............. *H04L 49/356* (2013.01); *H04L 49/40* (2013.01); *H04L 49/45* (2013.01)
USPC ....................................................... 370/463

(58) Field of Classification Search
USPC ......... 370/252, 254, 351, 352, 355, 392, 400, 370/401, 419, 463
See application file for complete search history.

(56) References Cited

U.S. PATENT DOCUMENTS

| | | | |
|---|---|---|---|
| 6,826,195 B1 | 11/2004 | Nikolich et al. | |
| 7,197,042 B2 | 3/2007 | Norman et al. | |
| 7,246,245 B2 | 7/2007 | Twomey | |
| 7,406,038 B1 | 7/2008 | Oelke et al. | |
| 8,780,931 B2 | 7/2014 | Anantharam et al. | |
| 2003/0200330 A1 | 10/2003 | Oelke et al. | |
| 2004/0028063 A1 | 2/2004 | Roy et al. | |
| 2004/0088538 A1 | 5/2004 | Isip et al. | |
| 2006/0018329 A1 | 1/2006 | Nielsen et al. | |
| 2006/0050738 A1 | 3/2006 | Carr et al. | |
| 2008/0250120 A1 | 10/2008 | Mick et al. | |

(Continued)

OTHER PUBLICATIONS

Cisco Systems, "Cisco CRS Carrier Routing System Multishelf System Interconnection and Cabling Guide", Sep. 2011, San Jose, CA; 84 pages.

(Continued)

*Primary Examiner* — Kerri Rose
(74) *Attorney, Agent, or Firm* — Schmeiser, Olsen & Watts LLP; Michael A. Rodriguez

(57) ABSTRACT

A system includes scaled-out fabric coupler (SFC) boxes and distributed line card (DLC) boxes. Each SFC box has fabric ports and a cell-based switch fabric for switching cells. Each DLC box is in communication with every SFC box. Each DLC box has network ports receiving packets and network processors. Each processor has a fabric interface that provides SerDes channels. The processors divide each packet received over the network ports into cells and distribute the cells of each packet across the SerDes channels. Each DLC box further comprises DLC fabric ports through which the DLC is in communication with the SFCs. Each DLC fabric port includes a pluggable interface with a given number of lanes over which to transmit and receive cells. Each lane is mapped to one of the SerDes channels such that an equal number of SerDes channels of each fabric interface is mapped to each DLC fabric port.

22 Claims, 4 Drawing Sheets

(56) References Cited

U.S. PATENT DOCUMENTS

| | | |
|---|---|---|
| 2011/0066909 A1 | 3/2011 | Skirmont et al. |
| 2012/0173935 A1 | 7/2012 | Skirmont et al. |
| 2012/0287926 A1 | 11/2012 | Anantharam et al. |
| 2012/0294314 A1 | 11/2012 | Campbell et al. |
| 2014/0219286 A1 | 8/2014 | Anantharam et al. |

OTHER PUBLICATIONS

Conover, "Gigabit Ethernet Switches Set to Take on the Enterprise", Network Computing, No. 916, Sep. 15, 1998, 15 pages.

InfiniBand Trade Association, "Supplement to InfiniBand Architecture Specification vol. 1 Release 1.2.1, Annex A6: 120 GB/s 12x Small Form-factor Pluggable (CXP)", InfiniBand Architecture, Vol. 2, Sep. 2009; 94 pages.

Petrilla et al., "Common Pluggable Interface for 100GBase-CR10 and 100GBase-SR10", May 2009; 11 pages.

Schuchart, "What's the Deal with High-Speed Storage?—by the time Fibre Channel hits 8 GBps, iSCSI on 10 Gig Ethernet could be a worthy opponent", Network Computing, No. 1624, Nov. 2005; 3 pages.

Wirbel, "Router giants ratchet up IPTV rivalry IPTV", Electronic Engineering Times, No. 1440, Sep. 2006; 2 pages.

Non-Final Office Action in related U.S. Appl. No. 13/469,715, mailed on Nov. 5, 2013; 8 pages.

Non-Final Office Action in related U.S. Appl. No. 13/473,316, mailed on Dec. 17, 2013; 12 pages.

Notice of Allowance in related U.S. Appl. No. 13/469,715, mailed on Mar. 4, 2014; pages.

Final Office Action in related U.S. Appl. No. 13/473,316, mailed on Jul. 3, 2014; 13 pages.

Non-Final Office Action in related U.S. Appl. No. 14/245,026, mailed on Jul. 31, 2014; 8 pages.

Final Office Action in related U.S. Appl. No. 14/245,026, mailed on Dec. 12, 2014; 7 pages.

Non-Final Office Action in related U.S. Appl. No. 13/473,316, mailed on Jan. 15, 2015; 5 pages.

FABRIC INTERCONNECT FOR DISTRIBUTED FABRIC ARCHITECTURE

RELATED APPLICATION

This application claims priority to and the benefit of U.S. provisional application No. 61/486,383, filed on May 16, 2011, titled "Architecture and Mechanism of Dual Role Modular Scaled Out Fabric Coupler Chassis System," the entirety of which provisional application is incorporated by reference herein.

FIELD OF THE INVENTION

The invention relates generally to data centers and data processing. More particularly, the invention relates to an interconnect system used by network line cards and scaled-out fabric couplers in a distributed fabric system.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. The infrastructure of the data center, specifically, the layers of switches in the switch fabric, plays a central role in the support of the services. Interconnection among the various switches can be instrumental to scalability, that is, the ability to grow the size of the data center

SUMMARY

In one aspect, the invention features a distributed line card (DLC) comprising a plurality of network ports receiving packets over a network and a plurality of network processors. Each network processor has a fabric interface that provides a plurality of SerDes (Serializer/Deserializer) channels. Each network processor divides each packet received over the network ports into a plurality of cells and distributes the cells of each received packet across the SerDes channels. The DLC further comprises a plurality of fabric ports through which the DLC is in communication with scaled-out fabric couplers. Each fabric port includes a pluggable interface with a given number of lanes over which to transmit and receive cells. Each lane of each pluggable interface is mapped to one of the SerDes channels of the fabric interfaces of the plurality of network processors such that an equal number of SerDes channels of each fabric interface is mapped to each of the fabric ports.

In another aspect, the invention features an interconnect system including a plurality of scaled-out fabric coupler (SFC) boxes and a plurality of distributed line card (DLC) boxes. Each SFC box has a plurality of fabric ports and a cell-based switch fabric element for switching cells among the SFC fabric ports. Each DLC box is in communication with every one of the SFC boxes. Each DLC box has a plurality of network ports receiving packets over a network and a plurality of network processors. Each network processor has a fabric interface that provides a plurality of SerDes (Serializer/Deserializer) channels. The network processors divide each packet received over the network ports into a plurality of cells and distribute the cells of each received packet across the SerDes channels. Each DLC box further comprises a plurality of DLC fabric ports through which the DLC is in communication with the SFCs. Each DLC fabric port includes a pluggable interface with a given number of lanes over which to transmit and receive cells. Each lane of each pluggable interface is mapped to one of the SerDes channels of the fabric interfaces of the plurality of network processors such that an equal number of SerDes channels of each fabric interface is mapped to each of the DLC fabric ports.

In still another aspect, the invention features an interconnect system between a plurality of network switching elements and scaled-out fabric couplers. The interconnect system comprises a plurality of fabric ports through which the network switching elements are in communication with the scaled-out fabric couplers. Each fabric port includes a pluggable interface with a given number of lanes over which to transmit and receive cells. Each lane of each pluggable interface is mapped to a SerDes channel provided by one of the network switching elements. An equal number of SerDes channels of each network switching element is mapped to each of the fabric ports.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers described herein use standard form-factor pluggable interfaces, preferably standard IB CXP interfaces, to provide an interconnection between distributed line cards (DLC) chasses and scaled-out fabric couplers (SFC) chasses in a distributed chasses architecture. Through these standard pluggable interfaces, network switching elements of the DLCs transmit and receive proprietary cell-based payload over SerDes (serialization/deserialization) channels. Each pluggable interface provides a given number of lanes over which to transmit and receive the cells, with each lane of each pluggable interface being mapped to one of the SerDes channels provided by the network switching elements. Preferably, an equal number of SerDes channels of each network switching element of a given DLC is mapped to each of the pluggable interfaces. Accordingly, any given pluggable interface is connected to each of the network switching elements of the DLC by the same number of lanes. This configuration facilitates scalability, that is, the growth of the data center through an increase in the number of DLCs and/or number of networking switching elements in the DLCs.

Figure 1:
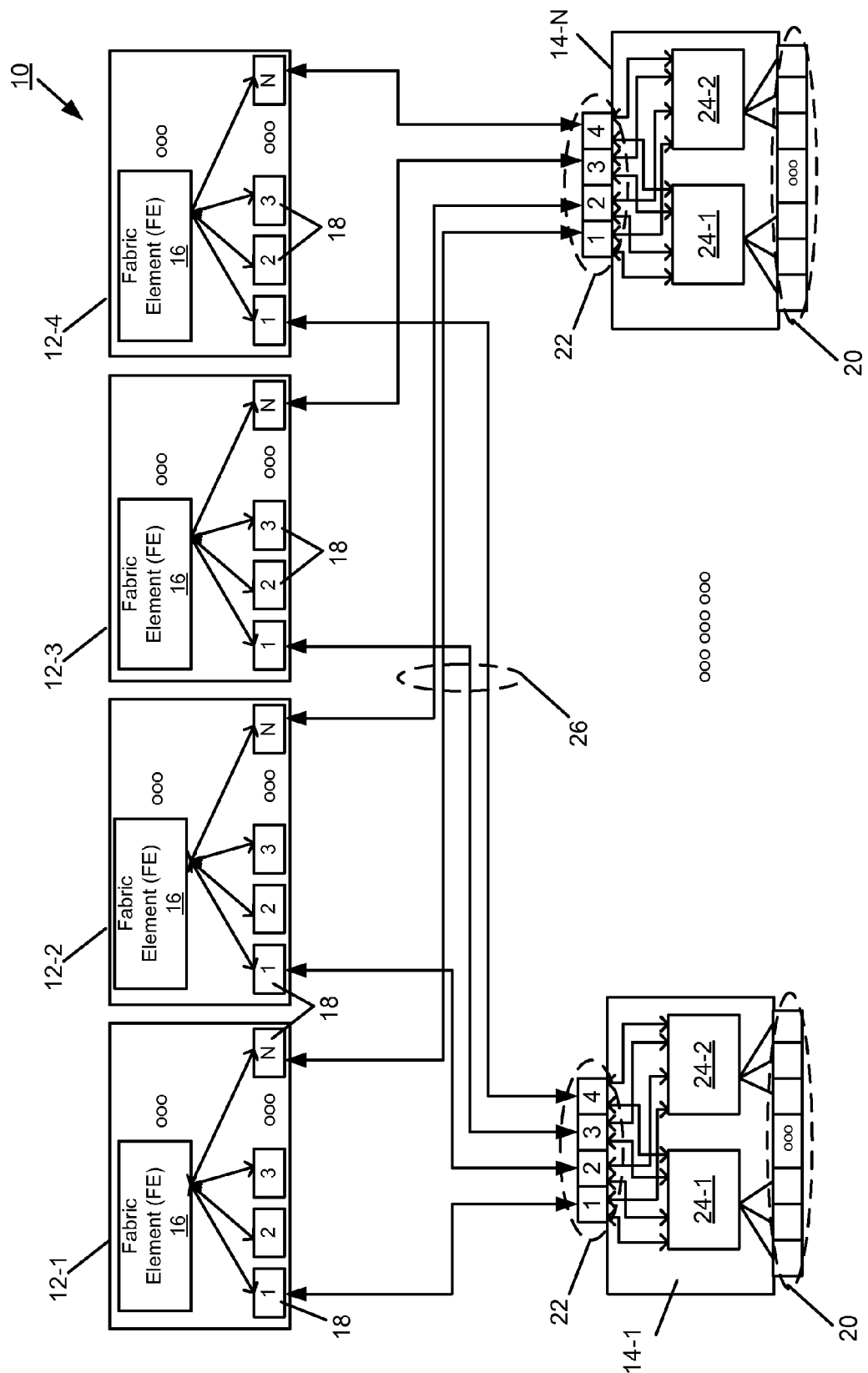
FIG. 1 is a diagram of an embodiment of a distributed chassis configuration having a plurality of scaled-out fabric coupler (SFC) boxes interconnected with a plurality of distributed line card (DLC) boxes.

FIG. 1 shows an embodiment of a distributed chassis architecture 10 that may be implemented in a data center. The distributed chassis architecture 10 has a plurality of switch SFC chasses or boxes 12-1, 12-M (generally, 12) in communication with a plurality of DLC chasses or boxes 14-1, 14-2, 14-N (generally, 14). This example embodiment has four SFC boxes (M=4) and N DLC boxes. The number, N, of DLCs can range in the hundreds and thousands. The SFCs and DLCs are part of a single cell-based switched domain.

Each SFC 12 includes one or more cell-based switch fabric elements (FE) 16 in communication with N fabric ports 18, there being at least as many fabric ports 18 in each SFC 12 as the number of DLC boxes 14 in the distributed chassis architecture 10. Each fabric element 16 of an SFC switches cells between fabric ports 18 based on the destination information in the cell header.

Each DLC box 14 has a plurality of network ports 20 and a plurality of fabric ports 22. The network ports 20 are in communication with a network external to the switched domain, such as the Internet. In one embodiment, each DLC 14 has 40 network ports 20, with each of the network ports 20 being configured as a 10 Gbps Ethernet port; the aggregate bandwidth of these DLCs is 400 Gbps.

Each DLC box 14 further includes a plurality of network processors (i.e., network switching elements) 24-1, 24-2 (generally, 24). Each network processor 24 is in communication with every fabric port 22 and a subset of the network ports 20 (for example, each network processor 24 can switch cells derived from packet traffic received on 20 of the 40 network ports). An example implementation of the network processor 24 is the BCM 88650, a 20-port, 10 GbE switch device produced by Broadcom, of Irvine, Calif.

Preferably, each fabric port 22 includes a 120 Gbps CXP interface. In one embodiment, the CXP interface has twelve lanes (12×), each lane providing a 10 Gbps channel. An example specification of the 120 Gbps 12×CXP interface can be found in the "Supplement to InfiniBand™ Architecture Specification Volume 2 Release 1.2.1", published by the InfiniBand™ Trade Association. This embodiment of 12-lane CXP is referred to as standard Infiniband (IB) CXP. In another embodiment, the CXP interface has 10 lanes (10×) for supporting 10-lane applications, such as 100 Gigabit Ethernet. This embodiment of 10-lane CXP is referred to as Ethernet CXP.

The distributed chassis architecture 10 is for a full-mesh configuration: each DLC 14 is in communication with each of the SFCs 12; more specifically, each of the fabric ports 22 of a given DLC 14 is in electrical communication with a fabric port 18 of a different one of the SFCs 12 over a communication link 26. Referring to the DLC 14-1 as a representative example, the DLC fabric port 22-1 of the DLC 14-1 is in communication with the fabric port 18-1 of the SFC 12-1, the DLC fabric port 22-2 with the fabric port 18-2 of the SFC 12-2, the DLC fabric port 22-3 with the fabric port 18-3 of the SFC 12-3, and the DLC fabric port 22-4 with the fabric port 18-4 of the SFC 12-4. Connected in this full-mesh configuration, the DLCs and SFCs form a distributed virtual chassis, with the DLCs acting as line cards in the distributed chassis. The distributed virtual chassis is modular; that is, DLCs can be added to or removed from the distributed virtual chassis, one at a time, like line cards added to or removed from a chassis.

The communication link 26 between each DLC fabric port 22 and an SFC fabric port 18 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 26 can be a direct physical connection (i.e., electrical connectors of the DLC fabric ports 22 physically connect directly to electrical connectors of the SFC fabric ports 18).

During operation of the distributed virtual chassis, a packet arrives at a network port 20 of one of the DLCs 14. The network processor 24 of the DLC 14 that is in communication with the network port 20 upon which the packet arrives partitions the packet into smaller cells, adding a pre-classification header and a cell header (used in ordering of cells) to each cell. The network processor 24 sends the cells out through the fabric ports 22 to each of the SFCs 12, sending different cells to different SFCs 12. For example, consider an incoming packet with a length of 1600 bits. The receiving network processor 24 of the DLC 14 can split the packet into four cells of 400 bits (before adding header information to those cells). The network processor 24 then sends a different cell to each of the four SFCs 12, in effect, achieving a load balancing of the cells across the SFCs 12.

A cell-based switch fabric element 16 of each SFC 12 receiving a cell examines the header of that cell, determines its destination, and sends the cell out through the appropriate one of the fabric ports 18 of that SFC to the destination DLC 14. The destination DLC 14 receives all cells related to the original packet from the SFCs, reconstructs the original packet (i.e., removing the added headers), and sends the reconstructed packet out through the appropriate one of its network ports 22. Continuing with the previous four-cell example, consider that each SFC determines that the destination DLC is DLC 14-2. Each SFC 12 sends its cell out through its fabric port 18-2 to the DLC 14-2. The DLC 14-2 reassembles the packet from the four received cells (the added packet headers providing an order) and sends the packet out of the appropriate network port 22. The pre-classification header information in the cells determines the appropriate network port.

The full-mesh configuration of FIG. 1, having the four SFCs, is a full-line rate configuration, that is, the aggregate bandwidth for transmitting cells from a given DLC to the SLCs (i.e., 480 Gpbs) is greater than the aggregate bandwidth of packets arriving at the given DLC on the network ports 22 (i.e., 400 Gpbs). The configuration can also be adapted to support various oversubscription permutations for DLCs 14. For example, instead of having four SFCs, the distributed chassis architecture 10 may have only two SFCs 12-1, 12-2, with each DLC 14 using only two fabric ports 22 for communicating with the SFCs, one fabric port 22 for each of the SFCs 12. This permutation of oversubscription has, for example, each DLC on its network side with an aggregate ingress 400 Gbps bandwidth (40 10 Gbps Ethernet Ports) and an aggregate egress 240 Gbps cell-switching bandwidth on its two 120 Gbps fabric ports 22 for communicating with the two SFCs. Other oversubscription permutations can be practiced.

Figure 2:
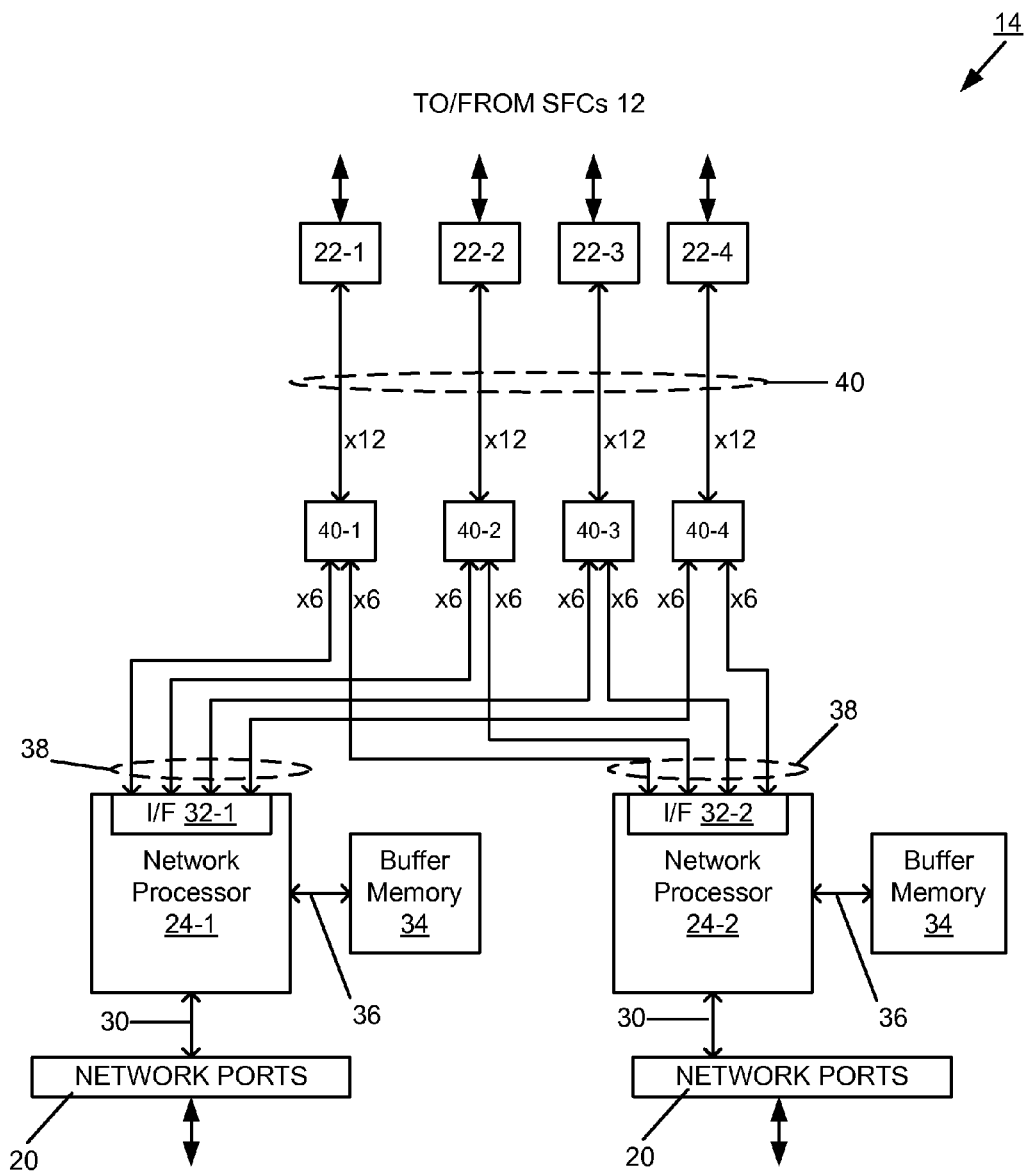
FIG. 2 is a diagram of an embodiment of a DLC having two network processors.

FIG. 2 shows an embodiment of the DLC 14 including the network ports 20 in communication with the network processors 24-1, 24-2 through a PHY interface 30. In one embodiment, the PHY interface 30 includes an XFI electrical interface (of a 10 Gigabit Small Form Factor Pluggable Module (XFP)) for each of the network ports 22. Each network processor 24 has a fabric interface (UF) 32 in communication with buffer memory 34 over memory channels 36. In one embodiment, the buffer memory 34 is implemented with DDR3 SDRAM (double data rate synchronous dynamic random access memory) devices.

The fabric interface 32 of each network processor 24 includes a serializer/deserializer (SerDes), not shown, that preferably provides 24 channels 38. The SerDes includes a pair of functional blocks used to convert data between serial and parallel interfaces in each direction. In one embodiment, each SerDes channel 38 operates at a 10.3 Gbps bandwidth; the aggregate bandwidth of the 24 channels being approximately 240 Gbps (or 480 Gbps when taking both fabric interfaces). In another embodiment, each SerDes channel operates at a 25 Gbps bandwidth. The 24 SerDes channels 38 are grouped into four sets of six channels each.

The DLC 14 further includes PHYs 40-1, 40-2, 40-3, 40-4 (generally 40) in communication with the four (e.g., standard IB CXP) fabric ports 22-1, 22-2, 22-3, 22-4, respectively, of the DLC 14. Each of the PHYs 40 is also in communication with a group of six SerDes channels 38 from each of the two network processors 24-1, 24-2 (thus, each of the PHYs 40 supports 12 SerDes channels 38).

Figure 3:
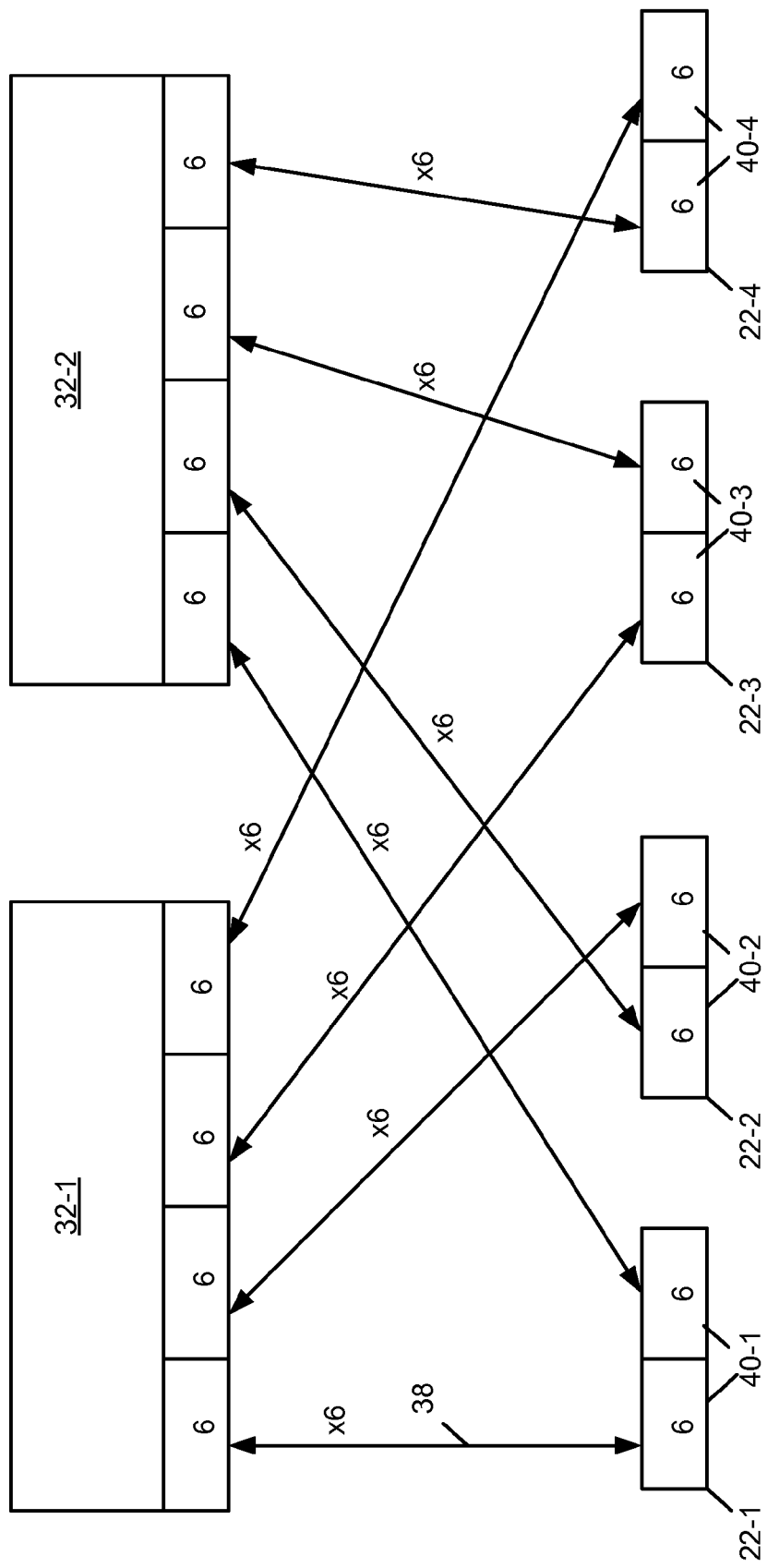
FIG. 3 is a diagram of an embodiment of the interconnections between the fabric interfaces of the two network processors and CXP/PHYs of the DLC.

FIG. 3 shows an embodiment of the interface connections between the fabric interfaces 32-1, 32-2 (generally, 32) of the two network processors 24-1, 24-2, respectively, and the standard IB CXP fabric ports 22 of the DLC 14. In FIG. 3, the PHYs 40 are incorporated into the standard IB CXP fabric ports 22. In this embodiment, each standard IB CXP fabric port 22 supports 12 lanes, which map to six SerDes channels from each of the two fabric interfaces 32-1, 32-2. Each fabric interface 32 provides 24 SerDes channels 38 divided into four groups of six channels. For each of the fabric interfaces 32, one group of six SerDes channels 38 passes to a different one of the four standard IB CXP fabric ports 22. For example, one group of 6 SerDes channels from each fabric interface 32-1, 32-2 maps to the PHYs 40-1 of the standard IB CXP fabric port 22-1, a second group of 6 SerDes channels from each fabric interface 32-1, 32-maps to standard IB CXP 22-2, a third group of 6 SerDes channels from each fabric interface 32-1, 32-2 maps to standard IB CXP 22-3, and a fourth group of 6 SerDes channels from each fabric interface 32-1, 32-2 maps to standard IB CXP 22-4.

Figure 4:
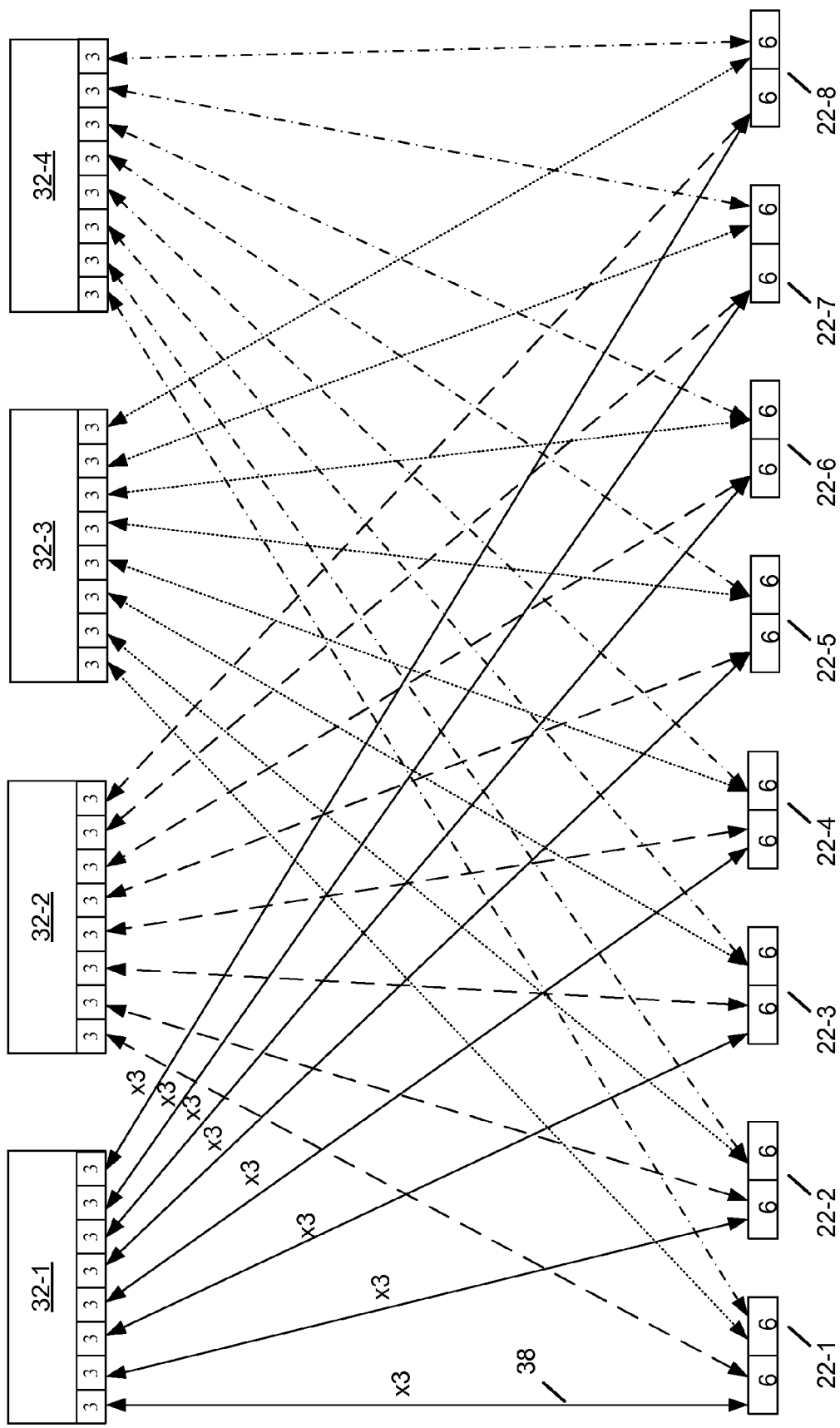
FIG. 4 is a diagram of another embodiment of interconnections between the fabric interfaces of four network processors of an example DLC and its eight CXP/PHYs.

The principles illustrated by the interface connections of FIG. 3 apply to other embodiments of the DLC 14. For example, consider an example embodiment of a DLC having four network processors and eight standard IB CXP/PHYs, each supporting 12 lanes. FIG. 4 shows an embodiment of the interface connections between the fabric interfaces 32-1, 32-2, 32-3, and 32-4 of the four network processors and the eight standard IB CXP/PHYs 22-1 to 22-8 (generally, 22). Further, in this example, the 24 SerDes channels provided by each fabric interface 32 are partitioned into eight groups of three SerDes channels each. Each group of three SerDes channels of a given fabric interface 32 is mapped to a different one of the eight standard IB CXP fabric ports 22. In addition, three SerDes channels from each of the four fabric interfaces 32 are mapped to each standard IB CXP fabric port 22.

As another example, consider that the DLC 14 has six network processors (with, accordingly, six fabric interfaces). Each fabric interface provides 24 SerDes channels, which can be partitioned into six groups of two SerDes channels each. Each standard IB CXP fabric port 22 supports 12 lanes mapped to 12 SerDes channels, two SerDes channels coming from each of the six fabric interfaces.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

While the invention has been shown and described with reference to specific preferred embodiments, it should be understood by those skilled in the art that various changes in form and detail may be made therein without departing from the spirit and scope of the invention as defined by the following claims.

What is claimed is:

1. A distributed line card (DLC), comprising:
   a plurality of network ports receiving packets over a network;
   a plurality of network processors, each network processor having a fabric interface that provides a plurality of SerDes (Serializer/Deserializer) channels, each network processor dividing each packet received over the network ports into a plurality of cells and distributing the cells of each received packet across the SerDes channels; and
   a plurality of fabric ports through which the DLC is in communication with scaled-out fabric couplers, each fabric port including a pluggable interface with a given number of lanes over which to transmit and receive cells, each lane of each pluggable interface being mapped to one of the SerDes channels of the fabric interfaces of the plurality of network processors such that an equal number of SerDes channels of each fabric interface is mapped to each of the fabric ports.

2. The DLC of claim 1, wherein the pluggable interfaces are CXP interfaces.

3. The DLC of claim 2, wherein the given number of lanes is twelve.

4. The DLC of claim 2, wherein the given number of lanes is ten.

5. The DLC of claim 1, wherein the network ports are 10 Gigabit Ethernet ports.

6. The DLC of claim 1, wherein each of the SerDes channels has approximately a 10.3 Gbps bandwidth.

7. The DLC of claim 1, wherein an aggregate bandwidth for receiving packets arriving at the network ports is less than an aggregate bandwidth of cells leaving the DLC fabric ports.

8. The DLC of claim 7, wherein the aggregate bandwidth for receiving packets arriving at the network ports is approximately 200 Gbps and the aggregate bandwidth of cells leaving the DLC fabric ports is approximately 240 Gbps.

9. An interconnect system, comprising:
   a plurality of scaled-out fabric coupler (SFC) boxes, each SFC box having a plurality of fabric ports and a cell-based switch fabric element for switching cells among the SFC fabric ports; and
   a plurality of distributed line card (DLC) boxes, each DLC box being in communication with every one of the SFC boxes, each DLC box comprising:
      a plurality of network ports receiving packets over a network;
      a plurality of network processors, each network processor having a fabric interface that provides a plurality of SerDes (Serializer/Deserializer) channels, the network processors partitioning each packet received over the network ports into a plurality of cells and distributing the cells of each received packet across the SerDes channels; and
      a plurality of DLC fabric ports through which the DLC is in communication with the SFCs, each DLC fabric port including a pluggable interface with a given number of lanes over which to transmit and receive cells, each lane of each pluggable interface being mapped to one of the SerDes channels of the fabric interfaces of the plurality of network processors such that an equal number of SerDes channels of each fabric interface is mapped to each of the DLC fabric ports.

10. The system of claim 9, wherein the pluggable interfaces are CXP interfaces.

11. The system of claim 10, wherein the given number of lanes is twelve.

12. The system of claim 10, wherein the given number of lanes is ten.

13. The system of claim 9, wherein the network ports are 10 Gigabit Ethernet ports.

14. The system of claim 9, wherein each of the SerDes channels has approximately a 10.3 Gbps bandwidth.

15. The system of claim 9, wherein an aggregate bandwidth for receiving packets arriving at the network ports is less than an aggregate bandwidth of cells leaving the fabric ports.

16. The system of claim 15, wherein the aggregate bandwidth for receiving packets arriving at the network ports is approximately 200 Gbps and the aggregate bandwidth of cells leaving the DLC fabric ports is approximately 240 Gbps.

17. An interconnect system between a plurality of network switching elements and scaled-out fabric couplers, the interconnect system comprising:
   a plurality of fabric ports through which the network switching elements are in communication with the scaled-out fabric couplers, each fabric port including a pluggable interface with a given number of lanes over which to transmit and receive cells, each lane of each pluggable interface being mapped to a SerDes channel provided by one of the network switching elements, an equal number of SerDes channels of each network switching element being mapped to each of the fabric ports.

18. The system of claim 17, wherein the pluggable interfaces are CXP interfaces.

19. The system of claim 18, wherein the given number of lanes is twelve.

20. The system of claim 18, wherein the given number of lanes is ten.

21. The system of claim 17, wherein each of the SerDes channels has approximately a 10.3 Gbps bandwidth.

22. The system of claim 17, wherein an aggregate egress bandwidth of the fabric ports is approximately 240 Gbps.

* * * * *